(12) United States Patent
Peng (10) Patent No.: US 7,251,089 B2
(45) Date of Patent: Jul. 31, 2007

(54) STORAGE MEDIUM WITH OVERCOAT LAYER FOR ENHANCED HEATING

(75) Inventor: Chubing Peng, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 2 days.

(21) Appl. No.: 11/031,849

(22) Filed: Jan. 7, 2005

(65) Prior Publication Data

US 2006/0152839 A1 Jul. 13, 2006

(51) Int. Cl.
*G11B 5/02* (2006.01)

(52) U.S. Cl. ........................................ 360/59

(58) Field of Classification Search .............. 360/59, 360/69, 75, 60, 74.5, 77.02, 77.03, 78.04; 369/13.04, 13.33, 275.5
See application file for complete search history.

(56) References Cited

U.S. PATENT DOCUMENTS

| | | | | |
|---|---|---|---|---|
| 5,008,129 A | * | 4/1991 | Boling et al. ............... | 427/160 |
| 5,051,978 A | * | 9/1991 | Mayer et al. ............. | 369/275.5 |
| 5,420,836 A | * | 5/1995 | Machida ................... | 369/13.04 |
| 5,461,595 A | * | 10/1995 | Machida ................... | 369/13.04 |
| 6,069,853 A | * | 5/2000 | Novotny et al. ......... | 369/13.33 |
| 6,714,370 B2 | | 3/2004 | McDaniel et al. ............ | 360/59 |
| 2003/0128452 A1 | | 7/2003 | McDaniel et al. ............ | 360/59 |
| 2003/0128633 A1 | | 7/2003 | Batra et al. ............... | 369/13.32 |
| 2003/0184903 A1 | | 10/2003 | Challener .................... | 360/59 |
| 2003/0198146 A1 | | 10/2003 | Rottmayer et al. ....... | 369/13.13 |
| 2003/0235121 A1 | | 12/2003 | Eppler ..................... | 369/13.24 |
| 2004/0001394 A1 | | 1/2004 | Challener ................ | 369/13.32 |
| 2004/0001420 A1 | | 1/2004 | Challener .............. | 369/112.27 |
| 2004/0008591 A1 | | 1/2004 | Johns et al. ............. | 369/13.14 |
| 2004/0062503 A1 | | 4/2004 | Challener ................... | 385/129 |

FOREIGN PATENT DOCUMENTS

| | | |
|---|---|---|
| WO | WO 03/058641 A2 | 7/2003 |
| WO | WO 03/060884 A1 | 7/2003 |
| WO | WO 2004/060882 A1 | 7/2003 |
| WO | WO 2004/003891 A1 | 1/2004 |
| WO | WO 2004/003932 A2 | 1/2004 |
| WO | WO 2004/032118 A1 | 4/2004 |

* cited by examiner

*Primary Examiner*—Fred F. Tzeng
(74) *Attorney, Agent, or Firm*—Westman, Champlin & Kelly, P.A.

(57) ABSTRACT

A data storage system includes a magnetic storage medium and a write head configured to be positioned adjacent the storage medium and. The write head includes a magnetic field source configured to apply a magnetic field to the storage medium and an optical near field coupling structure configured to locally heat the magnetic storage medium with an optical near field proximate the magnetic field applied by the magnetic field source. An overcoat layer on the magnetic storage medium enhances absorption of the optical near field.

23 Claims, 12 Drawing Sheets

STORAGE MEDIUM WITH OVERCOAT LAYER FOR ENHANCED HEATING

GOVERNMENT RIGHTS

This invention was made with United States Government support under Agreement No. 70NANB1H3056 awarded by the National Institute of Standards and Technology (NIST). The United States Government has certain rights in the invention.

FIELD OF THE INVENTION

This invention relates to the field of data storage, and more particularly to write heads and methods for recording information on data storage media using near-field optical coupling structures.

BACKGROUND OF THE INVENTION

Magnetic recording heads are used in magnetic disc drive storage systems. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with perpendicular magnetic storage media may include a pair of magnetically coupled poles, including a write pole having a relatively small bottom surface area and a return pole having a larger bottom surface area. A coil having a plurality of turns is located adjacent to the write pole for inducing a magnetic field between the pole and a soft underlayer of the storage media. The soft underlayer is located below a hard magnetic recording layer of the storage media and enhances the amplitude of the field produced by the write pole. In the recording process, an electric current in the coil energizes the write pole, which produces a magnetic field. The image of this field is produced in the soft underlayer to enhance the field strength produced in the magnetic media. Magnetic flux that emerges from the write pole passes into the soft underlayer and returns through the return flux pole. The return pole is located sufficiently far apart from the main write pole such that the material of the return pole does not affect the magnetic flux of the write pole, which is directed vertically into the hard layer of the storage media. This allows the use of storage media with higher coercive force, consequently, more stable bits can be stored in the media.

As the magnetic media grain size is reduced for high areal density recording, superparamagnetic instabilities become an issue. The superparamagnetic effect is most evident when the grain volume V is sufficiently small that the inequality $K_uV/k_BT>40$ can no longer be maintained. $K_u$ is the material's magnetic crystalline anisotropy energy density, $k_B$ is Boltzmann's constant, and T is absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, the available recording heads are not able to provide a sufficient or high enough magnetic writing field to write on such a medium. Heat assisted magnetic recording, sometimes referred to as optical or thermal assisted recording, has been proposed to overcome at least some of the problems associated with the superparamagnetic effect. Heat assisted magnetic recording generally refers to the concept of locally heating a recording medium to reduce the coercivity of the recording medium so that an applied magnetic writing field can more easily direct the magnetization of the recording medium during the temporary magnetic softening of the recording medium caused by the heat source.

By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information. When applying a heat or light source to the medium, it is desirable to confine the heat or light to the track where writing is taking place and to generate the write field in close proximity to where the medium is heated to accomplish high areal density recording. The separation between the heated spot and the write field spot should be optimized that writing may occur while the medium temperature is substantially above ambient temperature. This also provides for the efficient cooling of the medium once the writing is completed.

In order to increase areal density in an optically assisted write head, the spot size of the optical beam can be decreased by either decreasing the wavelength of the light or increasing the numerical aperture of the focusing elements. Other optical techniques which either directly or indirectly reduce the effective optical spot size are generally referred to as "superresolution" techniques. For example, it is known that the resolving power of a microscope can be increased by placing an aperture with a pinhole (having a diameter smaller than the focused spot size) sufficiently close to the object being observed. As another example, tapered optical fibers have been used to achieve superresolution in near field scanning optical microscopy.

There is a need for an improved magnetic recording head that overcomes limitations, disadvantages, and/or shortcomings of known optically assisted magnetic recording heads.

SUMMARY OF THE INVENTION

A data storage system is provided which includes a storage medium. A write head is configured to be positioned adjacent the storage medium and includes an optical field coupling structure which is configured to locally heat the storage medium with an optical field. An overcoat layer on the storage medium enhances absorption of the optical field. In a method, a storage medium is heated using an optical field and includes an overcoat configured to enhance absorption of the optical field.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
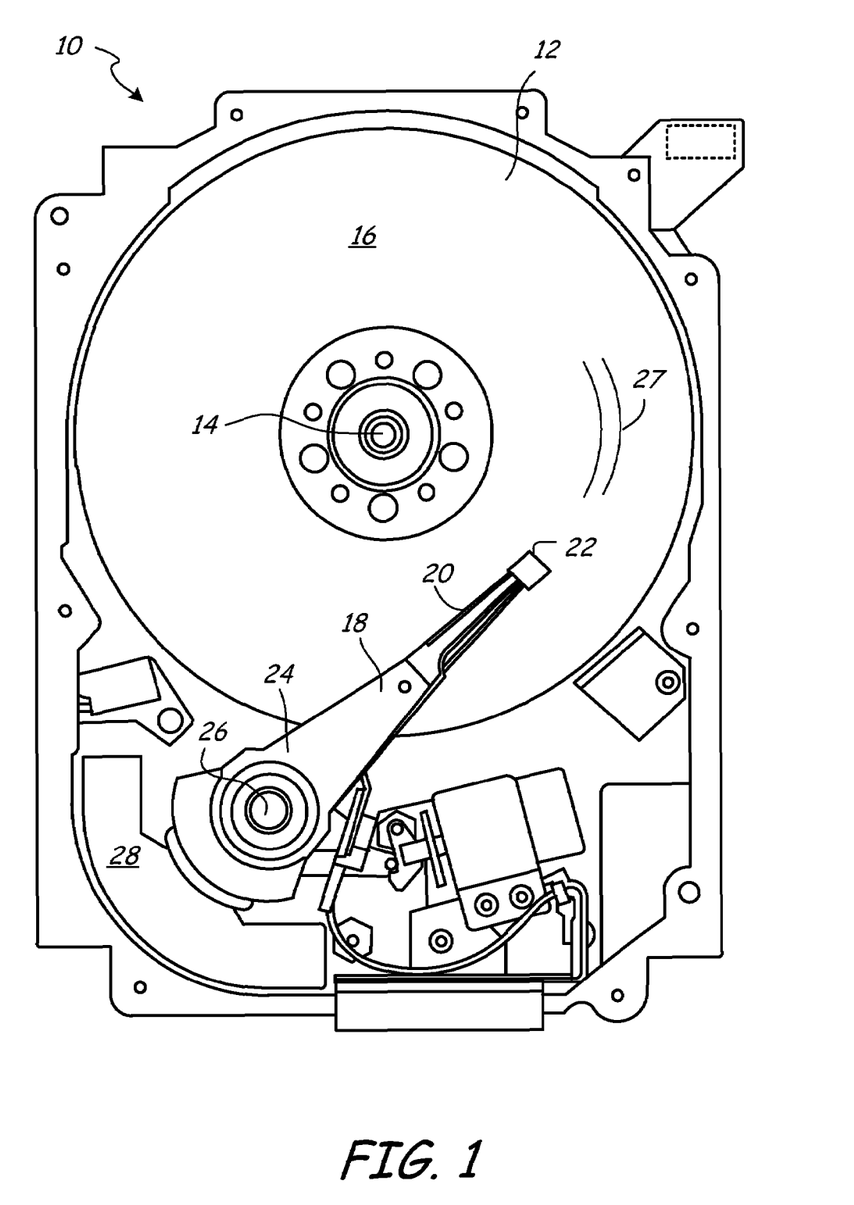
FIG. 1 is a pictorial representation of a disc drive that can include a recording head constructed in accordance with this invention.

Referring to the drawings, FIG. 1 is a pictorial representation of a disc drive 10 that can use a recording head constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16. At least one arm 18 is contained within the housing 12, with the arm 18 having a first end 20 for supporting a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is controlled by a controller, which is not shown in this view and is well known in the art.

Figure 2:
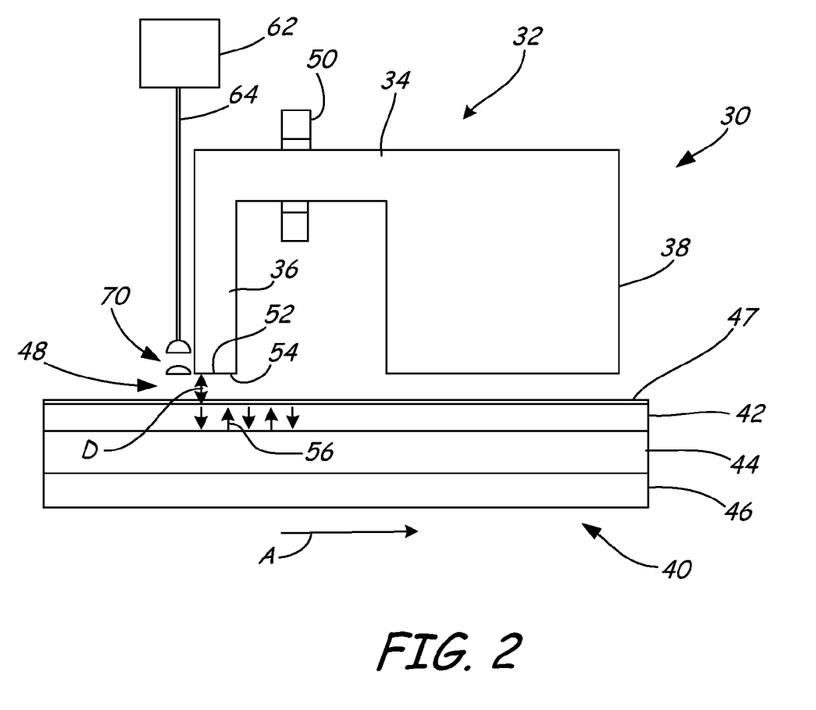
FIG. 2 is a side view of a recording head constructed in accordance with the invention.

FIG. 2 is a partially schematic side view of a perpendicular magnetic recording head 30 constructed in accordance with the invention. The recording head includes a magnetic write head 32 that is constructed using known technology and includes a yoke 34 that forms a write pole 36 and a return pole 38. The recording head 30 is positioned adjacent to a perpendicular magnetic storage medium 40 having a magnetically hard layer 42 and a magnetically soft layer 44 supported by a substrate 46. An air bearing 48 separates the recording head from the storage medium by a distance D. A coil 50 is used to control the magnetization of the yoke to produce a write field at an end 52 of the write pole adjacent to an air bearing surface 54 of the write head. The recording head 30 can also include a read head, not shown, which may be any conventional type read head as is generally known in the art.

The perpendicular magnetic storage medium 40 is positioned adjacent to or under the recording head 30 and travels in the direction of arrow A. The recording medium 40 includes a substrate 46, which may be made of any suitable material such as ceramic glass or amorphous glass. A soft magnetic underlayer 44 is deposited on the substrate 46. The soft magnetic underlayer 44 may be made of any suitable material such as, for example, alloys or multilayers having Co, Fe, Ni, Pd, Pt or Ru. A hard magnetic recording layer 42 is deposited on the soft underlayer 44, with the perpendicular oriented magnetic domains 56 contained in the hard layer 42. Suitable hard magnetic materials for the hard magnetic recording layer 42 may include at least one material selected from, for example, FePt or CoCrPt alloys having a relatively high anisotropy at ambient temperature. An overlayer 47 is provided to enhance absorption of radiation as discussed below in more detail.

The recording head 30 also includes elements for heating the magnetic storage medium 40 proximate to where the write pole 36 applies the magnetic write field H to the storage medium 40. Specifically, the components for heating include an optical fiber 64 which acts in association with a source 62 of radiant energy and is an optical communication with an optical coupling structure 70. The radiant energy can be, for example, visible light, infrared, ultra violet or other radiation. The transmitted radiant energy passes from the optical coupling structure 70 to the surface of the storage medium for heating a localized area of the storage medium 40, and particularly for heating a localized area of the hard magnetic layer 42.

The source 62 may be, for example, a laser diode, or other suitable light source. At the surface of the medium 40, the radiant energy is converted into heat in the medium 40. To most effectively heat the recording medium 40, the coupling structure 70 is preferably spaced apart from the medium 40 and, more specifically, spaced apart from the hard magnetic layer 42, by a distance of about 2 nm to about 50 nm. It will be appreciated that the separation distance is also dependent on the fly height required to maintain acceptable reading and writing (electromagnetic coupling for heating) by the recording head 30. Other separate distances can be selected as desired. The write head of FIG. 2 allows for heating of the recording medium 40 in close proximity to the write pole 36, which applies a magnetic write field H to the recording medium 40. Locating the optical coupling element 70 adjacent to the write pole 36, provides for increased writing efficiency due to the write field H being applied immediately down track from where the recording medium 40 has been heated. The hot spot will ideally raise the temperature of the medium 40 to approximately 200° C. The recording takes place at the thermal profile, which can also be called the thermal field or the thermal distribution, in the medium 40 for which the coercivity is equal to the applied recording field. Ideally, this thermal profile should be near the edge of the write pole 36 where the magnetic field gradients are the largest. This will record the sharpest transition in the medium 40. The optical waveguide 58 may be integrally formed with the write pole 36. However, the present invention can be implemented in any desired relationship with the write pole.

In operation, the recording medium 40 passes under the recording head 30, in the direction indicated by arrow A in FIG. 2. The source 62 transmits radiant energy via the optical fiber 64 to the optical coupling element 70. The optical coupling element 70 transmits the optical energy for heating the storage medium 40. More specifically, a localized area of the recording layer 42 is heated to lower the coercivity prior to the write pole 36 applying a magnetic write field H to the recording medium 40. Advantageously, this allows for higher coercivity storage media to be used while limiting the superparamagnetic instabilities that may occur with such recording media used for high recording densities.

At a down track location from where the medium 40 is heated, the magnetic write pole 36 applies a magnetic write field to the medium 40 for storing magnetic data in the recording medium 40. The write field H is applied while the recording medium 40 remains at a sufficiently high temperature for lowering the coercivity of the recording medium 40. This ensures that the write pole 36 can provide a sufficient or high enough magnetic write field to perform a write operation on the recording medium 40.

As discussed above, in a thermally assisted magnetic data storage system, information bits are stored on a storage layer at elevated temperatures. The heating area in the storage layer determines the dimensions of the data bit. One approach uses a technique similar to that of a light illuminated scanning-tunnel-microscopal (STM) to locally heat the storage layer adjacent to a tip. In order to achieve high areal data density, it is useful to achieve high optical power coupling efficiency. Some prior art techniques deliver optical power to the storage layer directly. However, since the electrical field near a tip of the optical coupling element is nearly normal to the surface of the storage medium, the delivery is not efficient.

The present invention provides an electromagnetic absorption overcoat layer to enhance absorption, or coupling efficiency of radiation used to locally heat the storage medium. The electromagnetic absorption overcoat layer can be, for example, a few nanometers thick and is carried on or near a surface of the target medium. This configuration can greatly increase the film temperature of the medium in response to an applied optical near field. The overcoat layer efficiently absorbs the electromagnetic waves from the tip of the optical coupling element in a relatively large temperature increases induced. Due to thermal diffusion, the temperature in the film adjacent to the overcoat layer will also be increased. The overcoat layer can be of any appropriate material. Examples include metallic particles or grains dispersed in a dielectric matrix. Example of metallic particles or grains include gold, silver, titanium, and others.

Figure 3:
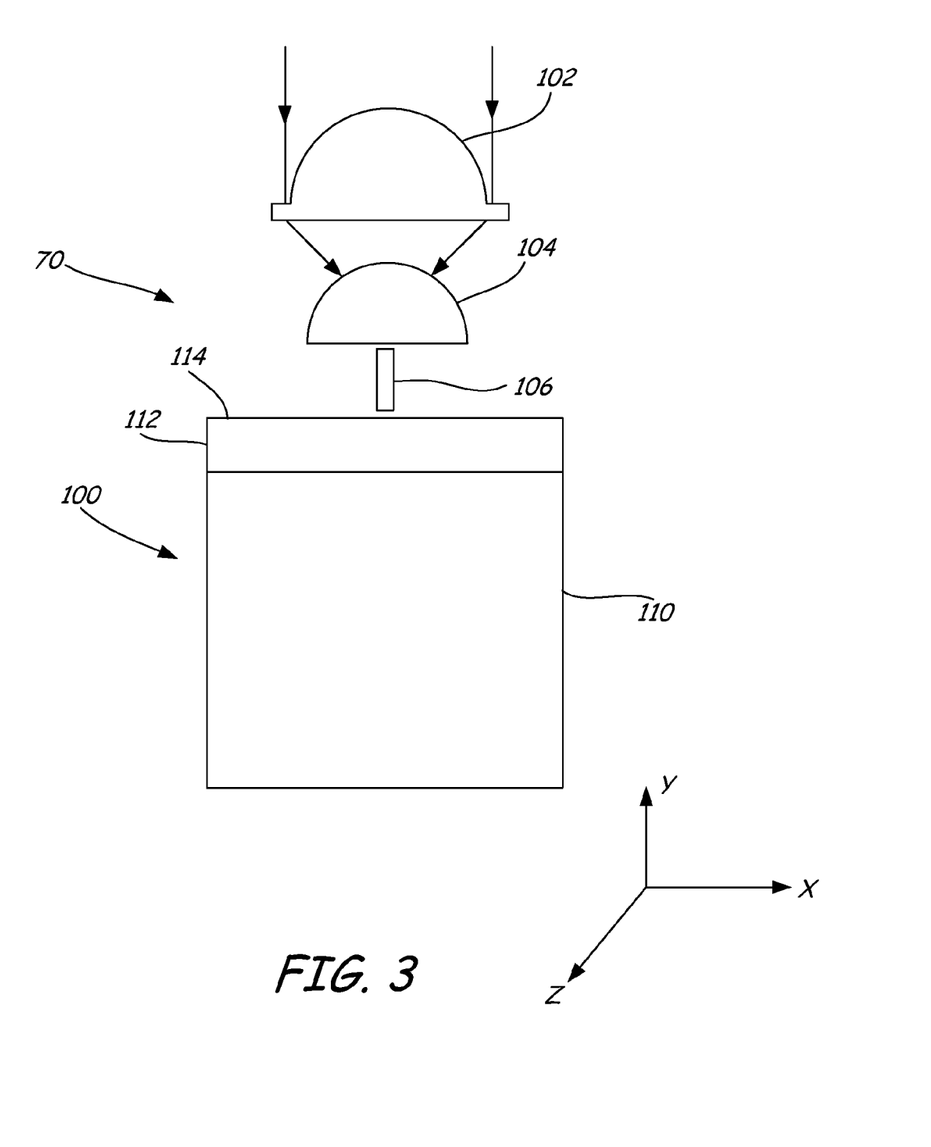
FIG. 3 is a side cross-sectional view showing an optical coupling component in a storage medium.

FIG. 3 is a more detailed view of optical coupling element 70 adjacent a magnetic storage medium 100. Optical coupling element 70 includes an objective lens 102, a solid hemisphere or solid immersion lens (SIL) 104, and a tip or pin 106. In operation, radiation is focused by the objective lens 102 onto the SIL 104. The pin 106 couples the optical near field to the surface of the storage medium 100.

Storage medium 100 includes a substrate 110, a gold layer 112, and a cobalt layer 114. In one specific example, layer 114 comprises cobalt having a thickness of 12 nanometers, layer 112 comprises a gold layer having a thickness of 100 nanometers, and pin 106 is formed from gold. The gold pin 106 provides an elongated metallic nanowire. A radially polarized beam of light, having unit power over the lens aperture, is brought into focus onto the center of the hemisphere solid immersion lens 104 by the objective lens 102. This illuminates the pin 106. In a specific example, the magnetic storage medium 100 is positioned approximately 10 nanometers below the optical coupling element 70. The numerical aperture of the objective lens is 0.85 and the refractive index of SIL 104 is 2.09. FIG. 3 also shows a Cartesian coordinate system. In this coordinate system, the origin (x, y & z) is at the center of the solid immersion lens 104. The pin 106 can be, for example, 48 nanometers wide along the x-axis and 48 nanometers wide along the z-axis. Its length along the y-axis can be 96 nanometers. Typically, the end of pin 106 closest to the storage medium 100 is substantially flat. However, any configuration can be used as desired. In the simulation set forth herein, the light has a wavelength of 833 nanometers, the complex refractive index of the pin 106 is 0.188+j 5.89, and the complex refractive index for the cobalt film 114 is 2.53+j 4.88.

Figure 4:
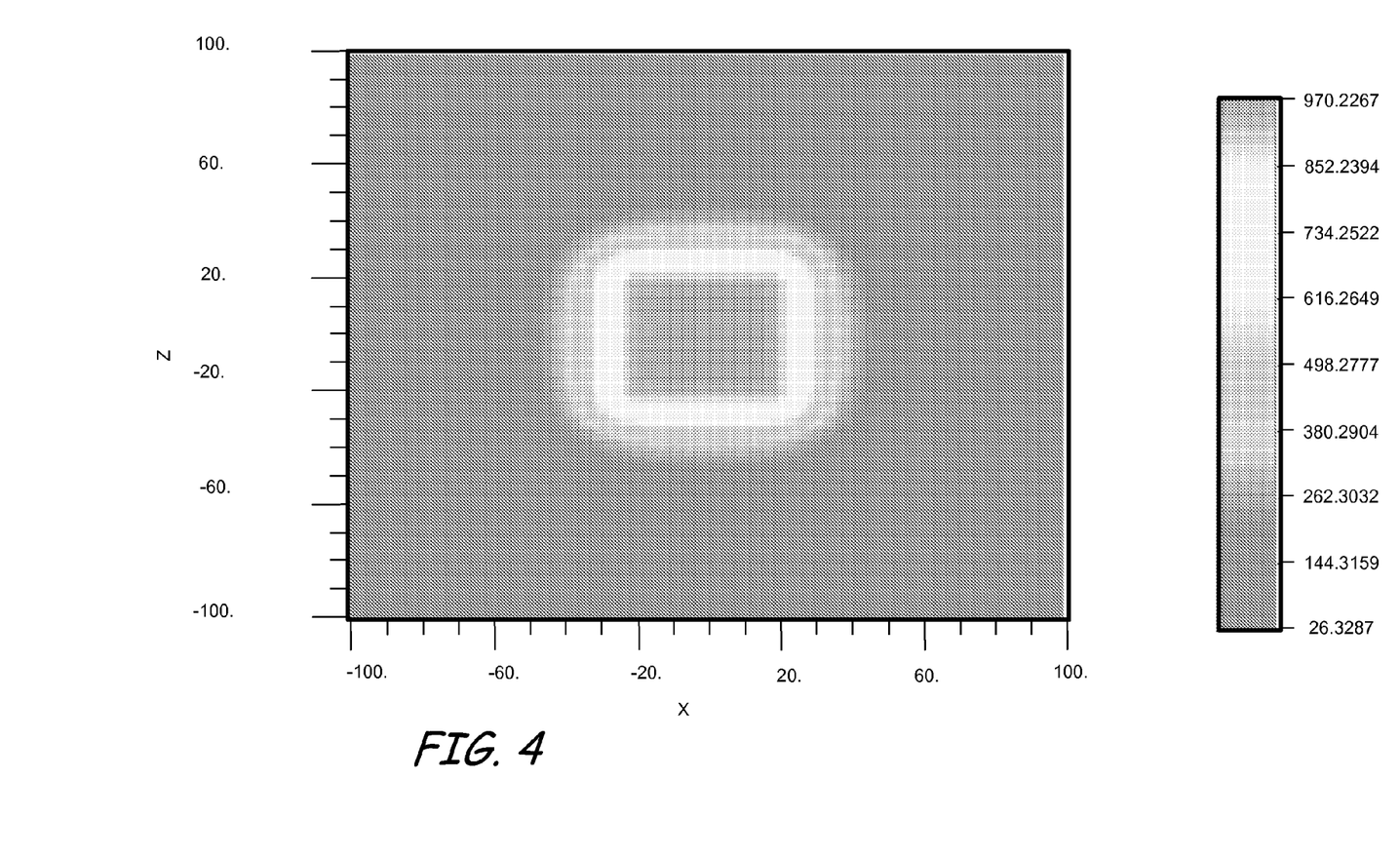
FIG. 4 is a graph in the x-z plane of the $E_y$ field at the air-gap.
Figure 5:
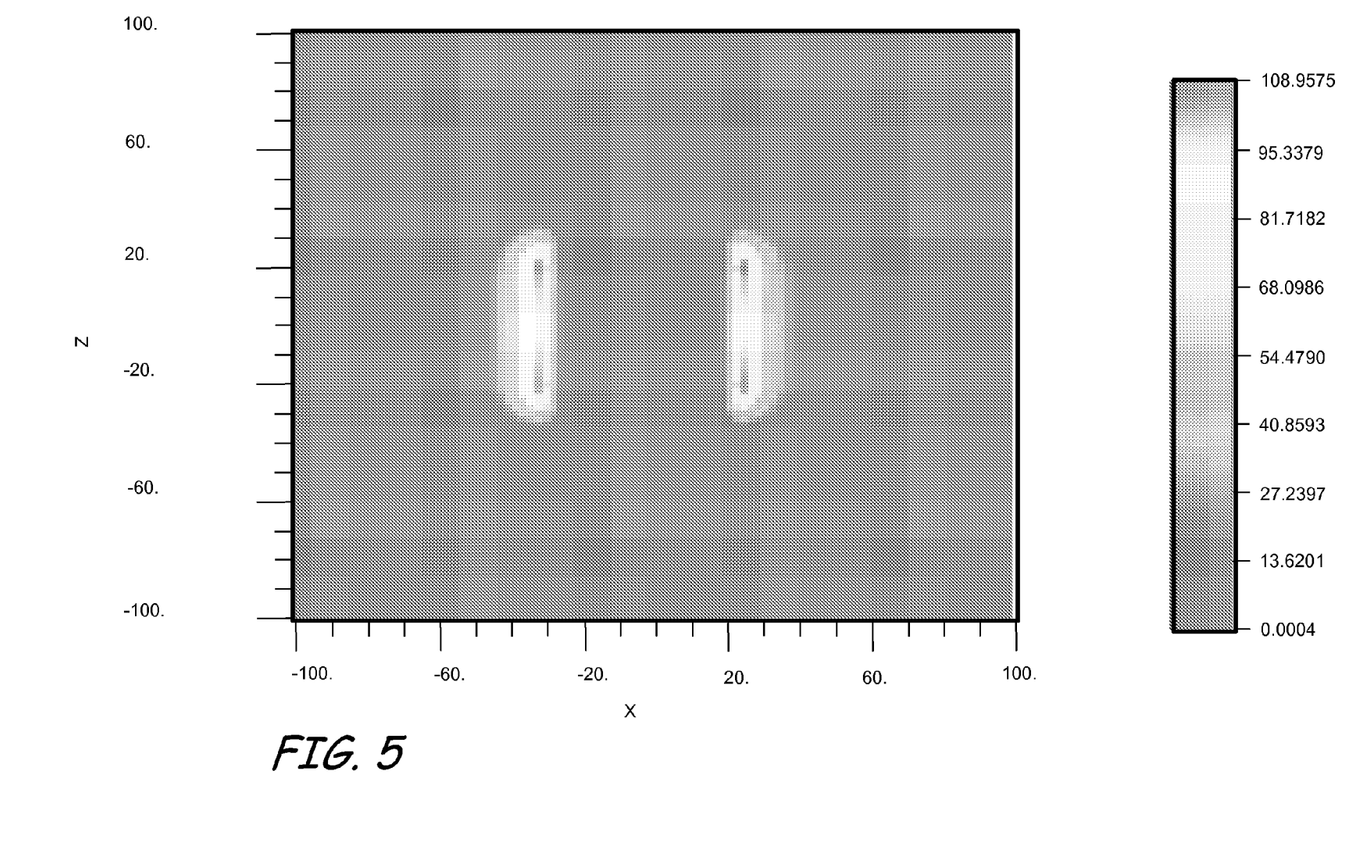
FIG. 5 is a graph in the x-z plane of the $E_z$ field at the air-gap.
Figure 6:
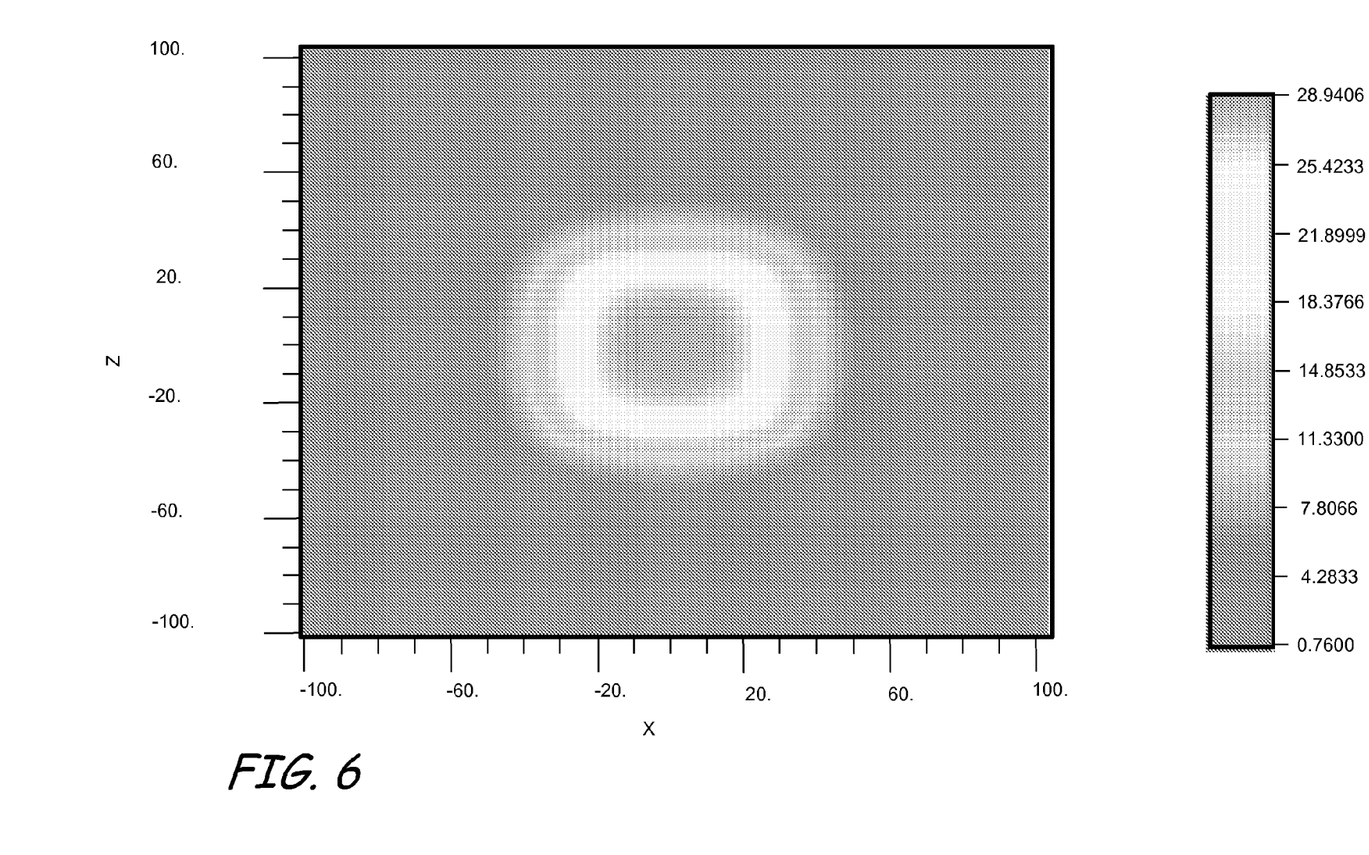
FIG. 6 is a graph in the x-z plane of the $E_y$ field on the film surface.
Figure 7:
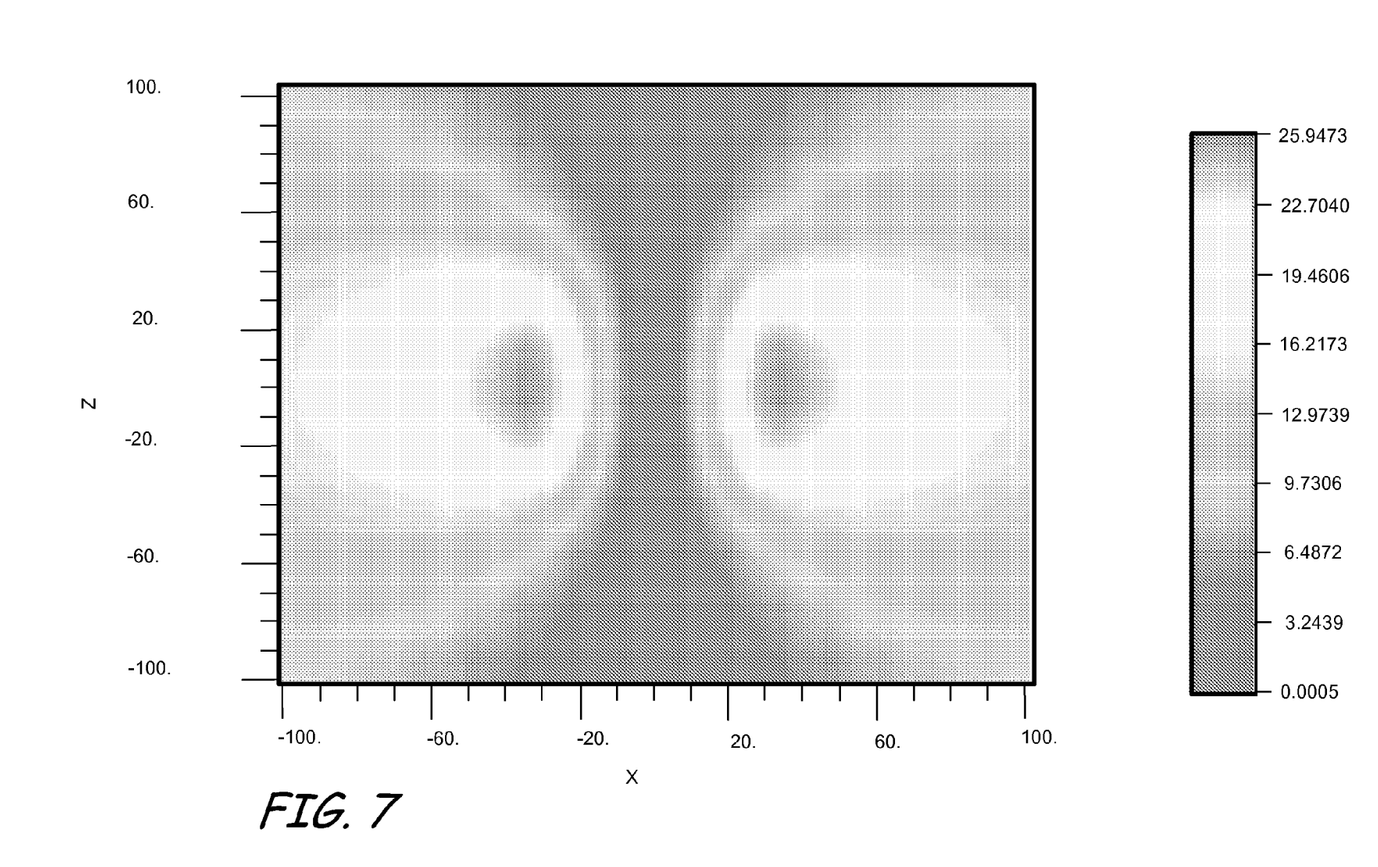
FIG. 7 is a graph in the x-z plane of the $E_z$ field on the film surface.

FIG. 4 is a graph showing the relative strength of $E_y$ field in the z versus x plane and FIG. 5 is a graph of the $E_z$ in the z versus x plane. Note that the $E_x$ component distribution can be obtained by exchanging x and z in the $E_z$ distribution. The light is confined to a spot of full width at half-maximum (FWHM) of 58 nanometers. As illustrated in FIGS. 4 and 5, $E_y$ substantially dominates the E-field distribution. This means that the E-field is aligned nearly normal to the surface of the film. FIGS. 6 and 7 are similar to FIGS. 4 and 5, respectively, except that they are the fields on the surface of the magnetic storage medium. As illustrated in FIGS. 6 and 7, the $E_z$ and $E_x$ fields become much broader but the $E_y$ field is still substantially confined. In terms of magnitude, the $E_x$ and $E_z$ fields inside of the film of the medium are about one-fourth of that in the air-gap above the storage layer while the $E_y$ field is only about one-thirtieth of that in the air-gap. Since the E-field above the storage layer is substantially perpendicular to the film surface, the light is not efficiently coupled to the storage layer.

Figure 8:
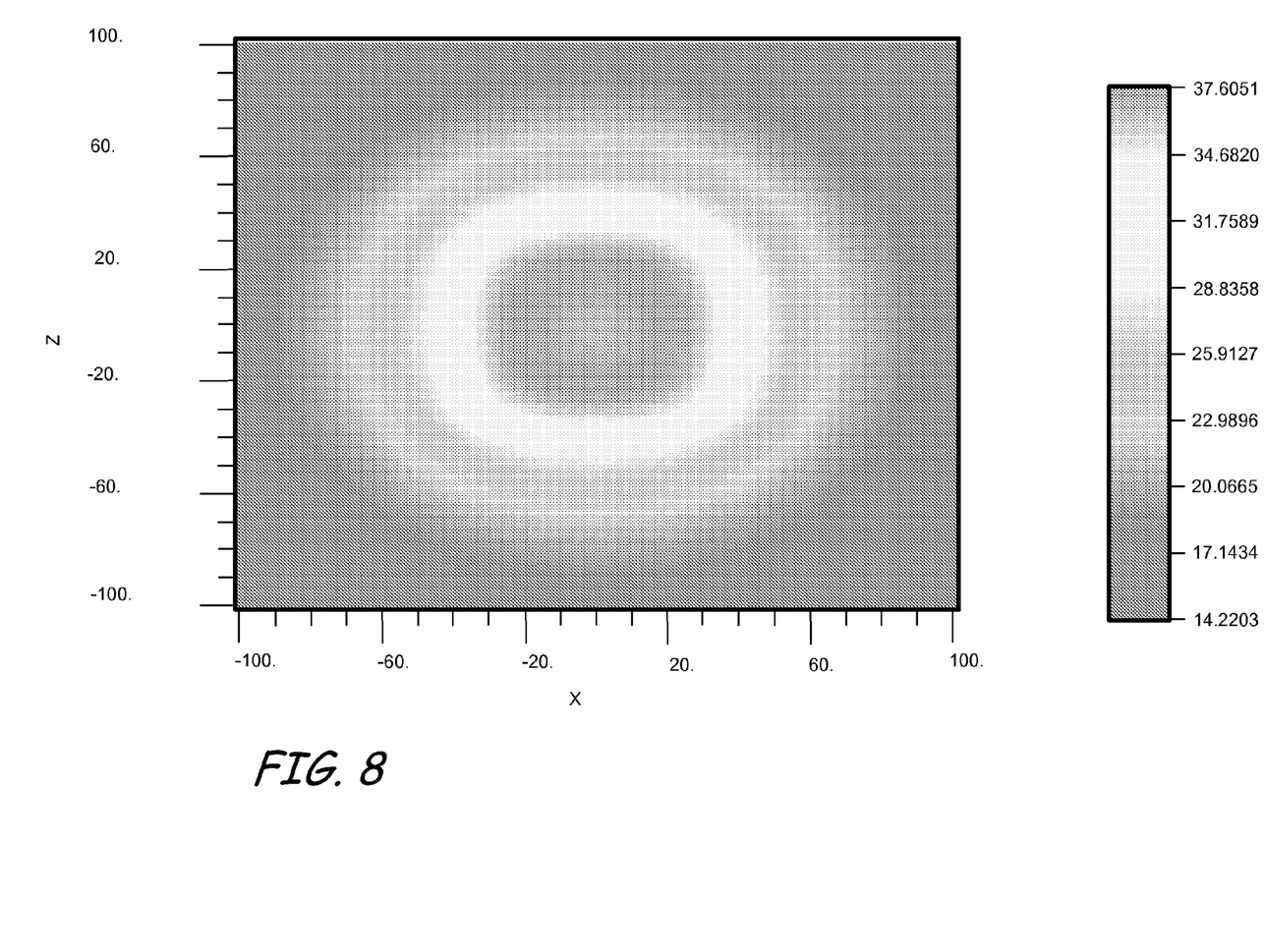
FIG. 8 is a profile of the temperature distribution in the x-z plane of a storage layer.

FIG. 8 is a profile showing the temperature distribution at the surface of the storage layer. The air-gap between the pin and the storage layer is 10 nanometers and the units in FIG. 8 are illustrated in nanometers. The profile shown in FIG. 4 is the calculated temperature rise at the surface of the storage layer under illumination of a laser having an output of 10 milliwatts for a two nanosecond duration. In this simulation, the optical properties (the index of refraction) and the thermal coefficients (the specific heat C in the thermal conductivity K) of the materials involved, including the SIL 104, the pin 106 and the storage layer 112, the heat sink layer 112 in the substrate 110 are temperature independent heat flow from the pin 106 to the storage medium 100 is not accounted for in the thermal calculation. Further, it is assumed that the specific heat C=2 joule/cm$_3$/° C. for all the materials, and the thermal conductivity K=0.1 watt/cm/° C. for the storage layer, which is about one-tenth of bulk value, K=3 watt/cm/° C. for the heat sink layer 110 and K =0.1 watt/cm/° C. for the substrate. As seen from FIG. 4, the temperature distribution is much broader than the $E_y$ distribution. The maximum temperature rises only about 37° C.

Figure 9A:
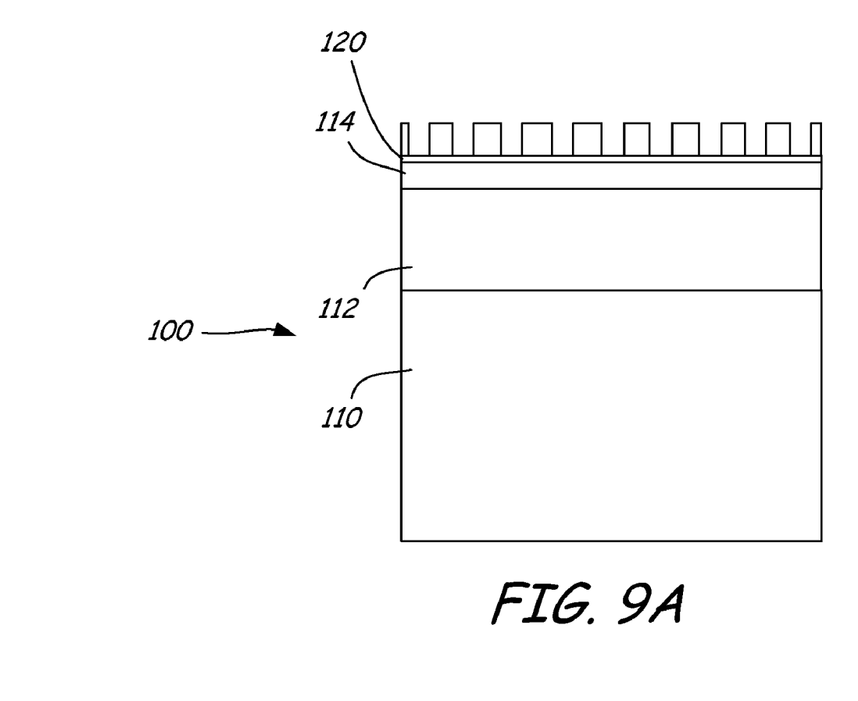
FIG. 9A is a side cross-sectional view and FIG. 9B is a top plan view of a magnetic storage medium including an overcoat layer.
Figure 9B:
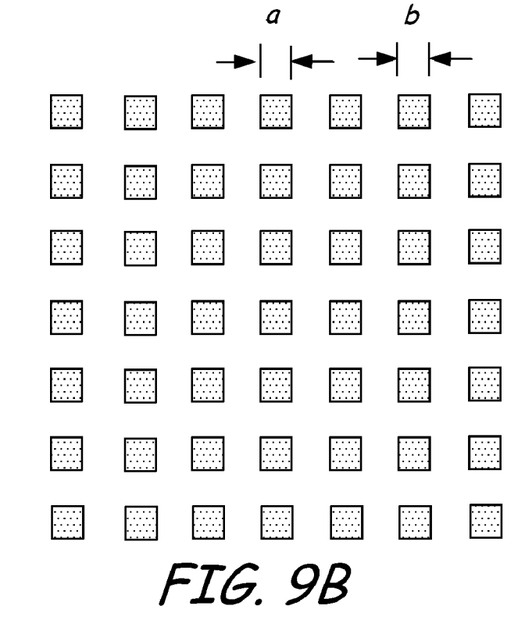
Figure 10:
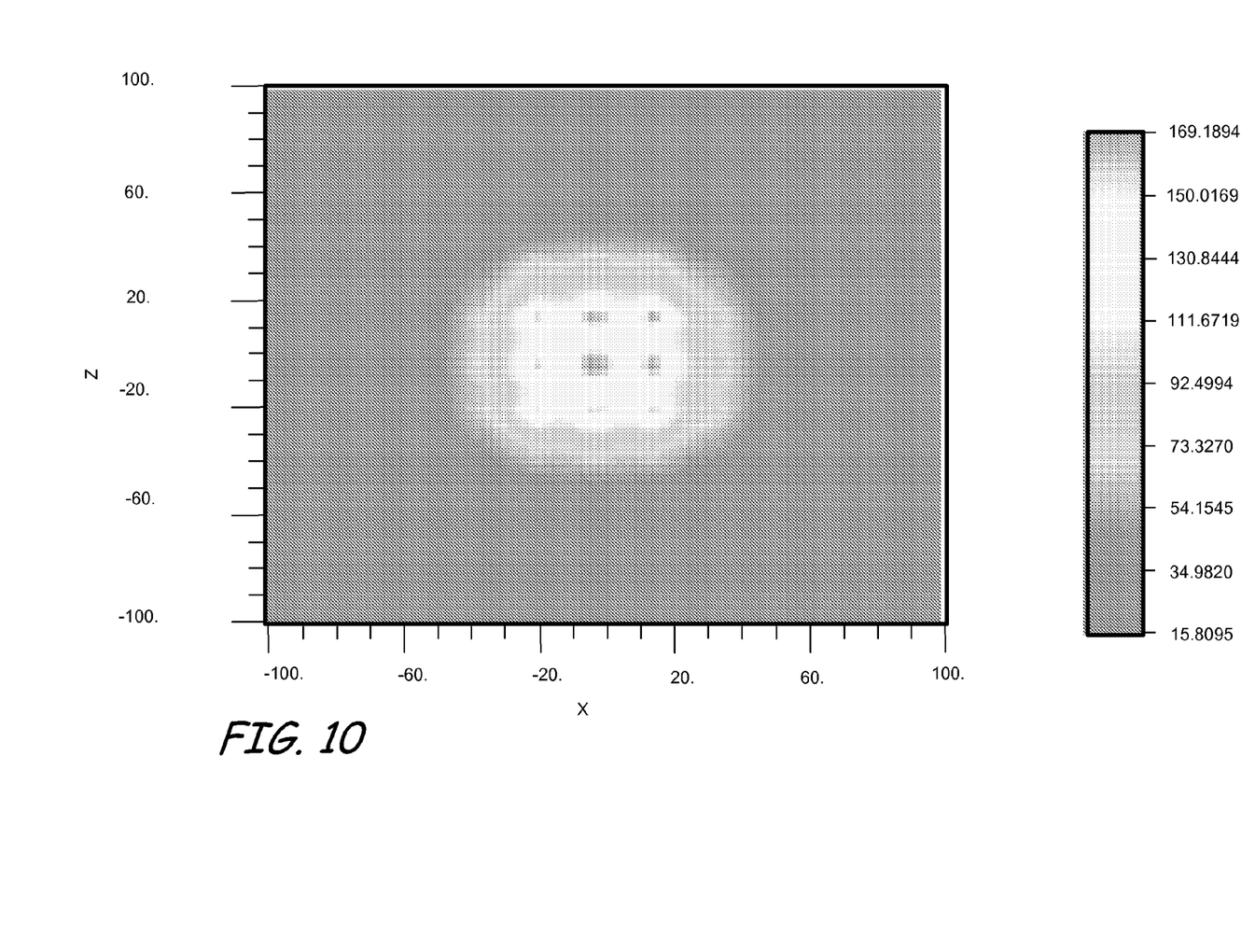
FIG. 10 is a temperature distribution in the x-z plane of the magnetic storage medium including the overcoat layer.

FIG. 9 is a side cross-sectional view and FIG. 9A is a side cross-sectional view and FIG. 9B is a top plan view of a graph of the magnetic storage medium 100 including an overcoat layer 120 in accordance with the present invention. In this example, the overcoat layer 120 comprises 5 nanometer cobalt grains dispersed in a dielectric material (SiO$_2$) overcoated on the surface of the storage medium 100. In such a configuration, a temperature distribution is illustrated in FIG. 10. The temperature distribution when an overcoat layer as illustrated in FIG. 5 is provided is a peak temperature rise of more than 170° C. This is a factor 5 increase in comparison to the case illustrated above without an overcoat layer. In this simulation, it is assumed that each grain in the overcoat layer is cubic having dimensions 6 nanometers by 6 nanometers by 5 nanometers. Further, the separation between grains is 12 nanometers. In the thermal calculation, thermal isolation between grains was not taken into account.

Figure 11:
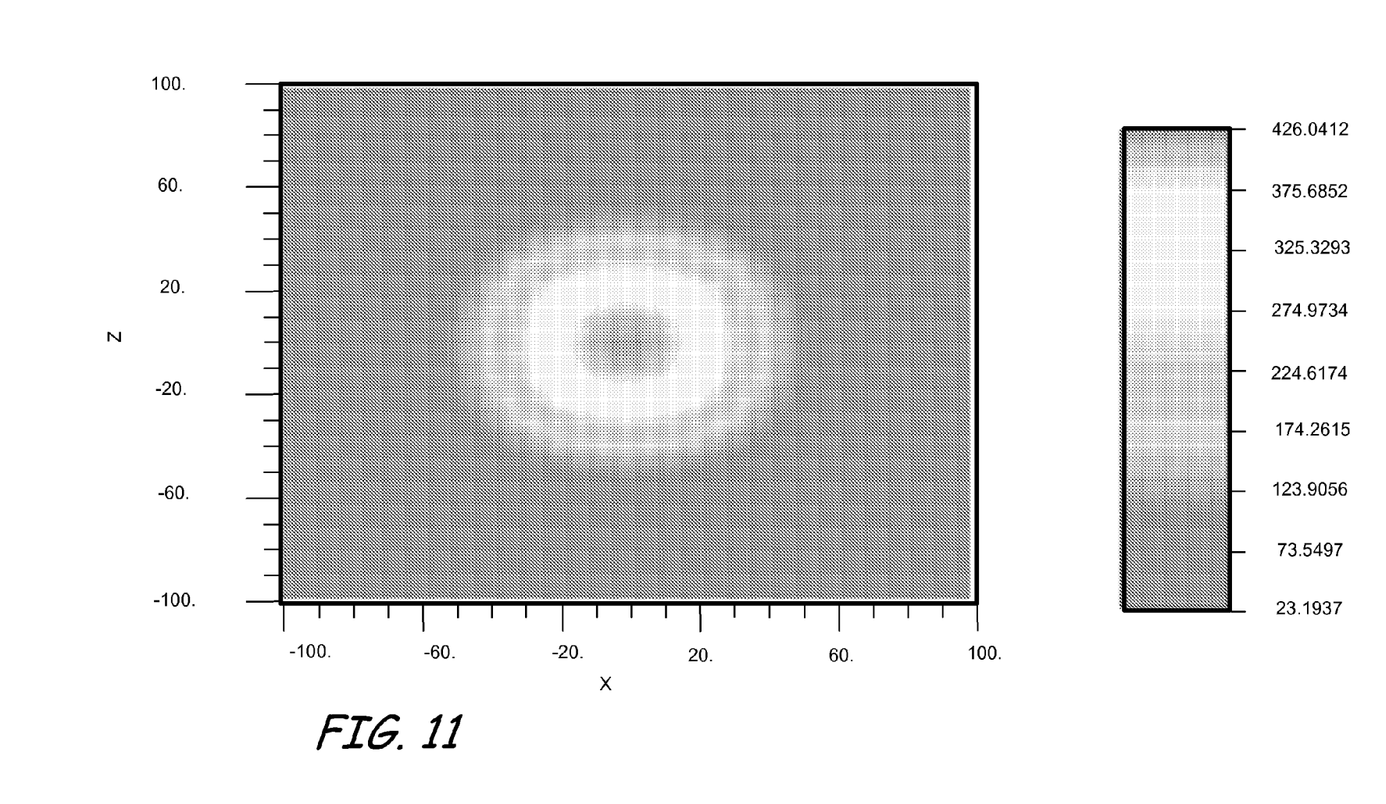
FIG. 11 is a temperature distribution across the magnetic storage medium in the x-z plane including an overcoat layer.
Figure 12:
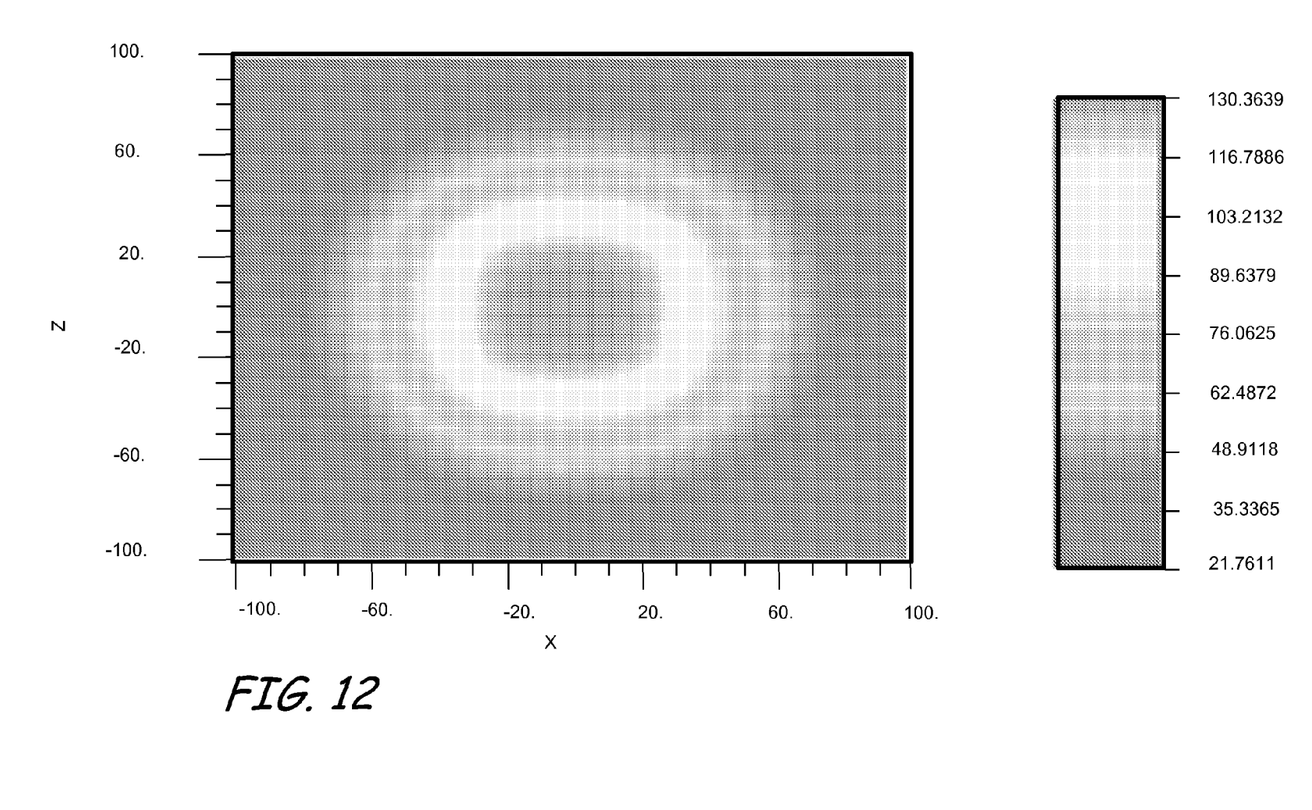
FIG. 12 is a temperature distribution across the magnetic storage medium in the x-z plane without an overcoat layer.

FIG. 10 is a graph showing the profile distribution of the cross-profile temperature distribution across the surface of the storage layer using an overcoat in accordance with the present invention. FIG. 11 is a graph showing a temperature distribution in which the overcoat layer thickness is 5 nanometers and is composed of 3 nanometer by 3 nanometer by 5 nanometer gold particles dispersed in an $SiO_2$ dielectric material. The separation between gold particles is 9 nanometers. In this calculation, the storage layer is 24 nanometers thick. In the thermal calculation, effective thermal conductivity of the overcoat layer is assumed to be 0.1 watts/cm/° C. In comparison, FIG. 12 is a graph showing a temperature distribution in the case without the 5 nanometer overcoat layer. The temperature rise in the embodiment with the overcoat layer is about 426° C. which is a factor 3.3 increase in comparison to the case without the overcoat layer. Further, the temperature distribution is confined to a smaller region when the overcoat layer is employed.

The invention can be implemented in many configurations. For example, the invention is applicable for use with near or far field configurations to locally heat a storage medium in which the electrical field responsible for the heating is mainly normal to the medium plane. Any type of medium can be used including magnetic, optical, and others. The overcoat layer provides efficient coupling of optical energy to the storage medium for local heating.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the overcoat layer system while maintaining substantially the same functionality without departing from the scope and spirit of the present invention. In addition, although the preferred embodiment described herein is directed to a disc drive system for data storage, it will be appreciated by those skilled in the art that the teachings of the present invention can be applied to any data storage system, without departing from the scope and spirit of the present invention. In the present invention, any appropriate overcoat layer, for example, any electromagnetic absorption overcoat layer of an electromagnetic absorbing material can be used as desired. In specific examples, the overcoat layer should include metal particles such as gold dispersed in a dielectric material or directly on the film surface. An anisotropy material which provides an impedance match between the near field and the material can be employed. Optical nonlinear absorption materials can also be used. The overcoat layer can be deposited using any appropriate technique including dipping, spin coating, sputter deposition, evaporative techniques, gaseous deposition techniques, or other techniques as desired. The pin discussed herein provides a nano-structure which condenses light to a spot and the electric field is mainly normal to the surface of medium.

What is claimed is:

1. A data storage system, comprising:
   a storage medium;
   a write head configured to be positioned adjacent the storage medium and including an optical field coupling structure configured to locally heat the storage medium; and
   an electromagnetic absorption overcoat layer on the storage medium to absorb energy from the optical field.

2. The data storage system of claim 1 wherein the data storage medium includes a magnetic data storage layer and heat from the overcoat layer is transferred by thermal coupling to the data storage layer.

3. The data storage system claim 1 wherein the overcoat layer includes metallic particles.

4. The data storage system claim 1 wherein the overcoat layer includes a dielectric material.

5. The data storage system claim 1 wherein the optical field comprises an optical near field.

6. The storage system of claim 5 wherein the optical field coupling structure includes a solid immersion lens.

7. The storage system of claim 5 wherein the optical field coupling structure includes a nano-structure which condenses light to a spot and the electric field is mainly normal to the surface of medium.

8. The data storage system claim 1 including a magnetic field source and wherein the storage medium comprises a magnetic storage medium.

9. The data storage system claim 1 wherein an E-field from the optical field is substantially perpendicular to a plane of the storage medium near a surface of the storage medium and wherein the E-field is efficiently coupled to the overcoat layer.

10. The data storage system claim 1 wherein the overcoat layer includes materials selected from the group of materials consisting of gold, silver and titanium.

11. The data storage system claim 1 wherein the overcoat layer comprises an anisotropy material configured to provide an impedance match between the optical field and the overcoat layer.

12. The data storage system claim 1 wherein the overcoat layer comprises an optical non-linear absorption material.

13. The data storage system claim 1 wherein the storage medium comprises a disc.

14. A method of writing information on a storage medium of a storage system, comprising:
   directing an optical field toward the storage medium;
   enhancing absorption of the optical field with an overcoat layer of an electromagnetic absorbing material on a surface of the storage medium;
   writing data on the storage medium heated by the optical field.

15. The method of claim 14 wherein the data storage medium includes a magnetic data storage layer and heat from the overcoat layer is transferred by thermal coupling to the data storage layer.

16. The method of claim 14 including directing an E-field from the optical near field substantially perpendicular to a plane of the storage medium near a surface of the storage medium.

17. The method of claim 14 wherein the overcoat layer includes metallic particles.

18. The method of claim 14 wherein the overcoat layer includes a dielectric material.

19. The method of claim 14 including providing an impedance match between the near field and the overcoat layer.

20. A data storage system comprising:
a storage medium;
a write head configured to be positioned adjacent the storage medium; and
means for enhancing absorption on the storage medium of an optical field thereby locally heating the storage medium.

21. The storage system of claim 20 wherein means for enhancing absorption includes metallic particles.

22. The storage system of claim 20 wherein the means for enhancing absorption includes a dielectric material.

23. The data storage system of claim 20 wherein means for enhancing absorption further provides means for directing an E-field from the optical near field substantially perpendicular to a plane of the storage medium near a surface of the storage medium.

* * * * *

UNITED STATES PATENT AND TRADEMARK OFFICE
CERTIFICATE OF CORRECTION

PATENT NO. : 7,251,089 B2  Page 1 of 1
APPLICATION NO. : 11/031849
DATED : July 31, 2007
INVENTOR(S) : Peng It is certified that error appears in the above-identified patent and that said Letters Patent is hereby corrected as shown below:

Col. 8, line 14, change "system claim 1" to --system of claim 1--.

Col. 8, line 16, change "system claim 1" to --system of claim 1--.

Col. 8, line 18, change "system claim 1" to --system of claim 1--.

Col. 8, line 20, change "The storage system" to --The data storage system--.

Col. 8, line 22, change "The storage system" to --The data storage system--.

Col. 8, line 26, change "system claim 1" to --system of claim 1--.

Col. 8, line 29, change "system claim 1" to --system of claim 1--.

Col. 8, line 34, change "system claim 1" to --system of claim 1--.

Col. 8, line 37, change "system claim 1" to --system of claim 1--.

Col. 8, line 41, change "system claim 1" to --system of claim 1--.

Col. 8, line 43, change "system claim 1" to --system of claim 1--.

Col. 9, line 8, change "The storage system" to --The data storage system--.

Col. 10, line 1, change "The storage system" to --The data storage system--.

Signed and Sealed this

Fourteenth Day of April, 2009

JOHN DOLL
*Acting Director of the United States Patent and Trademark Office*